(12) United States Patent
Watanabe

(10) Patent No.: US 6,606,118 B1
(45) Date of Patent: Aug. 12, 2003

(54) CLAMPING CIRCUIT FOR SOLID-STATE IMAGING APPARATUS

(75) Inventor: Takashi Watanabe, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/398,343

(22) Filed: Sep. 17, 1999

(30) Foreign Application Priority Data

Sep. 17, 1998 (JP) ............................................ 10-263750

(51) Int. Cl.$^7$ ............................ H04N 5/217; H04N 9/64
(52) U.S. Cl. ........................................ 348/243; 348/241
(58) Field of Search ................................. 348/243, 241, 348/251; 257/291, 292, 293

(56) References Cited

U.S. PATENT DOCUMENTS 6,018,364 A * 1/2000 Mangelsdorf ................ 348/241
6,088,057 A * 7/2000 Heida ........................... 348/243

FOREIGN PATENT DOCUMENTS

JP          5-207220          8/1993

* cited by examiner

Primary Examiner—Wendy R. Garber
Assistant Examiner—Catherine J. Toppin
(74) Attorney, Agent, or Firm—Edwards & Angell; David G. Conlin

(57) ABSTRACT

A clamping circuit of a solid-state imaging apparatus for receiving a pixel signal including a black level and a signal level through a signal line and outputting the pixel signal with noise being suppressed, the clamping circuit includes: a first capacitance and an inverting amplifier inserted into the signal line and connected to each other in series; a first switch and a second switch connected to each other in series to form a serial circuit; and a second capacitance connected between the first and second switches of the serial circuit and a constant potential, wherein both sides of the serial circuit including the first switch and the second switch are connected to an input side and an output side of the inverting amplifier, respectively; the first switch and the second switch are opened and closed in synchronization with a clock signal; and a time constant defined by an output-side impedance of the inverting amplifier and the second capacitance when the first switch and the second switch are closed is sufficiently greater than a cycle of the clock signal.

4 Claims, 4 Drawing Sheets

CLAMPING CIRCUIT FOR SOLID-STATE IMAGING APPARATUS

BACKGROUND OF THE INVENTION

1. Field of the Invention

The present invention relates to a clamping circuit used for a correlation-double sampling (CDS) of a pixel signal output from a solid-state imaging apparatus.

2. Description of the Related Art

Various types of solid-state imaging apparatuses such as a CCD type apparatus, a CMOS type apparatus and the like have been proposed and put into practice. It is conventionally known that, in such apparatuses, the correlation double sampling (CDS) is extremely effective in suppressing noises of pixel signals including a black level and a signal level. In the correlation double sampling, the black level of each pixel signal is clamped at a clamping potential and then, during a signal level period, the clamping is released and a variation from the black level to the signal level is sampled and held.

For example, in the CCD type imaging apparatus, since a reset noise is generated for each pixel signal in correlation with the black level and the signal level, the reset noise can be removed by the above-described CDS operation. In the CMOS type imaging apparatus, since a fixed pattern noise is generated in correlation with the black level and the signal level, the fixed pattern noise can also be removed by the CDS operation. Furthermore, in any type of solid-state imaging apparatus, although a MOS type output amplifier is likely to generate a noise within a low frequency range, the low frequency noise can be suppressed by a CDS operation because there is a correlation between a black level and a signal level corresponding to each other.

In order to achieve this CDS operation, specialized elements other than the CCD are frequently used in the CCD type imaging apparatus. Therefore, the CCD type imaging apparatus results in a complicated circuit configuration in connection with a clamping circuit and a sample-hold circuit. For the CMOS type imaging apparatus, a relatively simple circuit configuration is proposed because the CCD and the CDS circuit can be easily integrated.

There is an example of the clamping circuit using a clamping capacitance and an inverting amplifier, which is described in Japanese Laid-Open Publication No. 5-207220. This publication discloses a technology for reducing a variation of each inverting amplifier by using a plurality of inverting amplifiers. However this technique does not directly relate to the present invention; therefore, a description thereof is omitted, except specific features of the clamping circuit shown in FIGS. 6A to 6C. FIG. 6A is a block diagram showing the entirety of a clamping circuit. FIG. 6B is a circuit diagram showing an inverting amplifier in the clamping circuit. FIG. 6C is a graph for illustrating an operation of the inverting amplifier.

As shown in FIG. 6B, an inverting amplifier 102 includes a combination of n-type MOSFETs 111 and 112. In the inverting amplifier 102, where threshold values of FETs 111 and 112 are $V_{T1}$, and $V_{T2}$, respectively, the following expressions (1) are satisfied:

$$Vo > Vi - V_{T1}, V_D - Vo > V_D - Vo - V_{T2} \qquad (1)$$

where Vi represents an input voltage (a pixel signal from a solid-state imaging apparatus), Vo represents an output voltage of a clamping circuit 101, and $V_D$ represents a power source voltage.

Under the conditions defined by the expressions (1), FETs 111 and 112 operate in a saturation region. In this case, currents $I_D$ flowing in the FETs 111 and 112 are equal, so that the following expression (2) is satisfied:

$$K \times (W_1/L_1) \times (Vi+V_{T1})^2 = K \times (W_2/L_2) \times (V_D-Vo-V_{T2})^2 \qquad (2)$$

where K represents a transconductance parameter, $W_1$ and $W_2$ represent channel widths of the FETs 111 and 112, respectively, and $L_1$ and $L_2$ represent channel lengths of the FETs 111 and 112, respectively.

Furthermore, from the expression (2), the output voltage Vo of the clamping circuit 101 is represented by the following expression (3):

$$Vo = -\alpha \times (Vi+V_{T1}) + (V_D - V_{T2}) \qquad (3)$$

where $\alpha = \sqrt{((W_1/L_1)/(W_2/L_2))}$.

The graph of FIG. 6C shows the relationship of the input voltage Vi and the output voltage Vo. In the graph of FIG. 6C, a linear portion 121 satisfies the expression (3).

In the clamping circuit shown in FIG. 6A, Vi=Vo=$V_1$ in the state that an input and an output of the inverting amplifier 102 are short-circuited.

When the FETs 111 and 112 are of an enhancement type, $V_{T1}>0$, $V_{T2}>0$. Therefore, when a clamping switch SW1 is turned OFF to separate the input and the output from each other, Vi<$V_1$, Vo>$V_1$, which satisfy the expression (1). Thus, the FETs 111 and 112 operate in a saturation region, i.e., in the linear portion 121 of FIG. 6C. Accordingly, a ratio of an output variation vo to an input variation vi is represented by the following expression (4):

$$vo/vi = -\alpha \qquad (4)$$

Under the above conditions, in the clamping circuit shown in FIG. 6A, when the clamping switch SW1 is turned ON by a control signal φc to short-circuit the input and the output of the inverting amplifier 102, a clamping potential becomes $V_1$. Thereafter, when the clamping switch SW1 is turned OFF and the input signal Vi is input while maintaining the OFF-state, a DC component of the input signal Vi is cut off by a clamping capacitance Cc. In addition, an AC component of the input signal Vi, i.e., the variation vi, is amplified by the inverting amplifier 102 with a gain of $-\alpha$, and the variation vo is output from the inverting amplifier 102. At this time, an output side potential of the inverting amplifier 102 is vo+$V_1$. Since a value α can be set at any large value as can be easily seen from the expression (3), the amplification can be carried out. Furthermore, the voltage $V_1$, which is to be a clamping voltage, is always fixed at any point in the linear portion 121 of FIG. 6C as described above by the input-output short circuiting, whereby an optimum operation point is obtained.

Assuming that the clamping circuit shown in FIG. 6A is operated at a high speed at the same periodic cycle as that of a pixel signal, each of the signals in the clamping circuit varies as shown in, for example, FIG. 7.

FIG. 7 shows the input voltage Vin (a pixel signal from the solid-state imaging apparatus). Within period $T_3$ of the pixel signal, period $T_1$ is a black level period, and period $T_2$ is a signal level period.

As shown in FIG. 7, even when the variation vi of a signal level with respect to the black level is constant in each pixel signal, the signal level varies for each pixel signal on a pixel signal-by-pixel signal basis due to a noise inherent in the solid-state imaging apparatus.

Such a noise inherent in the solid-state imaging apparatus is suppressed by the clamping operation. As shown in FIG.

7, during period $T_4$ within period $T_1$, the clamping switch SW1 is turned ON by the control signal φc to short-circuit the input and the output of the inverting amplifier 102. The black level is then clamped at a clamping potential $V_1$. Thereafter, the clamping is released, so that only the variation vi of the signal level is input to the inverting amplifier 102 through a clamping capacitance Cc. As a result, the variation vo (AC component) amplified with a gain of –α by the inverting amplifier 102 is provided as shown in FIG. 7. This suppresses the noise component of the pixel signal, so that only the signal level of the pixel signal is accurately extracted.

However, in the above conventional clamping circuit, the clamping potential includes:

1) a kTC noise introduced into the input side of the inverting amplifier 102 when the switch SW1 is turned ON; and
2) a noise generated at the output side of the inverting amplifier made of MOSFETs.

The kTC noise 1), which is generated even in an ideal case where the inverting amplifier includes no noise, is represented by the following expression (5):

$$V_{nA} = \sqrt{(kT/C)} \qquad (5)$$

where C represents an effective capacity at the input side of the inverting amplifier, k represents the Boltzmann constant, and T represents the absolute temperature.

The noise 2) is generally represented by the following expression (6):

$$V_{nB} = \sqrt{(\alpha^2 \times (V_{n1})^2 + (V_{n2})^2)} \qquad (6)$$

where $V_{n1}$ represents an equivalent noise which occurs at the FET 111 side (FIG. 6B), and $V_{n2}$ represents an equivalent noise which occurs at the FET 112 side. Each of $V_{n1}$ and $V_{n2}$ represents a sum of a thermal noise and a flicker noise.

Therefore, the sum of the noises $V_{nA}$ and $V_{nB}$, shown in the following expression (7), appears at the clamping potential:

$$V_n = \sqrt{((V_{nA})^2 + (V_{nB})^2)} \qquad (7)$$

Thus, the noise of the clamping potential includes the kTC noise, the thermal noise, and the flicker noise. The kTC noise and the thermal noise are white noises, and the flicker noise appears at a periodic cycle of 1/f (f represents frequency).

However, since the pixel signal is sampled by the clamping operation at a cycle of period $T_3 = 1/fc$, a noise spectrum of the clamping potential is limited by the Nyquist threshold, $f_N = fc/2$, resulting in a characteristic curve $V_N$ shown in FIG. 8. Likewise, a spectrum of the pixel signal is limited by the Nyquist threshold, $f_N = fc/2$, due to the sampling, resulting in a characteristic curve Vs shown in FIG. 8.

In view of the above discussions, the clamping potential is not stable at a value of $V_1$ shown in FIG. 6C, and varies due to a noise of the characteristic curve $V_N$ in FIG. 8 included in the noise $V_n$ represented by the expression (7). For example, as shown in FIG. 7, when the clamping potential varies with respect to the voltage $V_1$ by the amount of a noise component $\Delta v_o$ because of a noise component $\Delta v_n$, the signal level varies by the amount of a noise component $\Delta v_o$. This deteriorates the picture quality.

In other words, in the above described conventional circuit, a noise having a correlation with the black level and the signal level can be removed. However, when the clamping potential varies due to the noise $V_n$, the variation influences the signal level and therefore the picture quality deteriorates.

With reference to FIG. 6A, where Z represents an output impedance of the inverting amplifier 102 and C' represents a parasitic capacitance of the input side of the inverting amplifier 102, the time constant, τ=C'×Z, should be sufficiently shorter than ON period $T_4$ of the control signal φc. In this case, an operation frequency band of the inverting amplifier 102 is higher than the Nyquist threshold, $f_N = fc/2$. Thus, the operation frequency band does not affect signal processings at a frequency band $f_N$ or less.

SUMMARY OF THE INVENTION

According to one aspect of the present invention, a clamping circuit of a solid-state imaging apparatus for receiving a pixel signal including a black level and a signal level through a signal line and outputting the pixel signal with noise being suppressed, the clamping circuit includes: a first capacitance and an inverting amplifier inserted into the signal line and connected to each other in series; a first switch and a second switch connected to each other in series to form a serial circuit; and a second capacitance connected between the first and second switches of the serial circuit and a constant potential, wherein both sides of the serial circuit including the first switch and the second switch are connected to an input side and an output side of the inverting amplifier, respectively; the first switch and the second switch are opened and closed in synchronization with a clock signal; and a time constant defined by an output-side impedance of the inverting amplifier and the second capacitance when the first switch and the second switch are closed is sufficiently greater than a cycle of the clock signal.

In another embodiment of the present invention, the first switch includes a first MOSFET of a first conductive type and a second MOSFET of a second conductive type which are connected in parallel with each other; the second switch includes a third MOSFET of the first conductive type and a fourth MOSFET of the second conductive type which are connected in parallel with each other; the first MOSFET and the third MOSFET are driven by a first control signal; the second MOSFET and the fourth MOSFET are driven by a second control signal; and a polarity of the first control signal and a polarity of the second control signal are different from each other.

In still another embodiment of the present invention, a clamping circuit of a solid-state imaging apparatus further includes a sample-hold circuit for sampling and holding a signal level of the pixel signal input from the inverting amplifier, in which: in a black level period of the pixel signal, the first switch and the second switch are closed to perform a clamping operation, and in a signal level period of the pixel signal, the sample-hold circuit samples and holds a signal level of the pixel signal.

In still another embodiment of the present invention, the second capacitor is an external capacitor.

Hereinafter, the function of the present invention will be described.

According to the present invention, when first and second switches are turned ON during the clamping operation, a sufficiently large second capacitance is connected between a signal line and a constant potential (e.g., a ground potential). Thus, a noise component of the clamping potential on the signal line is cut off through the second capacitance, thereby reducing the amount of noises in the circuitry.

According to one embodiment of the invention, the first and second switches are made of a first conductive type MOSFET and a second conductive type MOSFET (e.g., n-type and p-type), and these transistors are driven by control signals which are opposite in phase to each other. Thus, an inductive noise generated due to the switch operation is canceled, whereby the clamping operation can be performed while achieving further noise reduction.

According to one embodiment of the invention, a sample-hold circuit is connected to the clamping circuit at a subsequent stage thereto. In such a configuration, a sample-hold operation is performed during a signal level period of a pixel signal from the solid-state imaging apparatus, while a clamping operation is performed during a black level period of the pixel signal. In this manner, the correlation double sampling is conducted. When the correlation double sampling is combined with a low noise clamping operation, an ideal clamping and sampling with a low noise can be achieved.

According to one embodiment of the invention, since the second capacitance is provided by an external capacitor, it is easy to set the second capacitance at a sufficiently large value. Thus, a noise suppression effect by the low-pass filter can be further improved.

Thus, the invention described herein makes possible the advantage of providing a clamping circuit for a solid-state imaging apparatus which significantly suppresses a noise caused by a clamping operation with a simple circuit configuration so as to provide high quality images.

This and other advantages of the present invention will become apparent to those skilled in the art upon reading and understanding the following detailed description with reference to the accompanying figures.

DESCRIPTION OF THE PREFERRED EMBODIMENTS

Hereinafter, an example of the present invention will be described with reference to the attached drawings.

Figure 1:
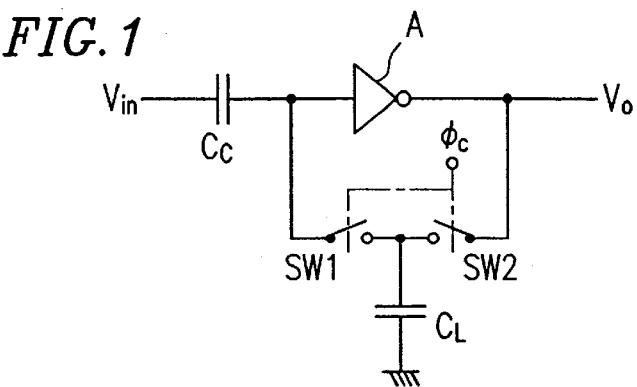
FIG. 1 is a block diagram showing an example of a clamping circuit according to the present invention.

FIG. 1 shows an example of a clamping circuit according to the present invention. In FIG. 1, a mark Cc represents a clamping capacitance (a first capacitance); a mark A represents an inverting amplifier; a mark $C_L$ represents a second capacitance; and marks SW1 and SW2 represent a first switch and a second switch, respectively. The first and second switches SW1 and SW2 are opened and closed by a common control signal $\phi c$.

The inverting amplifier A, the first and second switches SW1 and SW2, and the like can be formed on one semiconductor element. The second capacitance $C_L$ may be an external capacitance.

Figure 2:
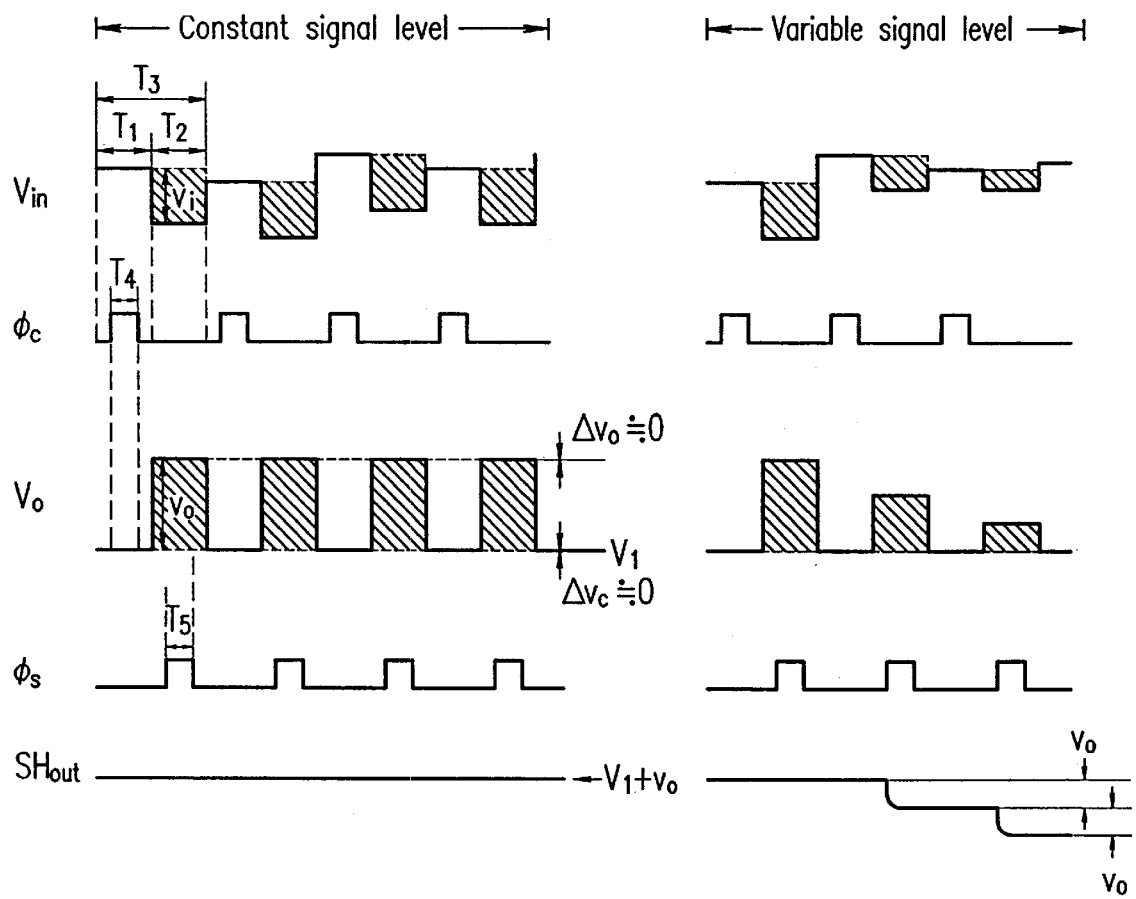
FIG. 2 is a timing chart showing each of the signals in the clamping circuit shown in FIG. 1.

FIG. 2 shows each of the signals in the clamping circuit of the present example. An input voltage Vin (a pixel signal from a solid-state imaging apparatus) includes a black level and a signal level. Each of the pixel signals is repeated at a cycle of period $T_3$. Within period $T_3$, period $T_1$ is a black level period, and period $T_2$ is a signal level period.

The pixel signal is input to the clamping capacitance Cc, and a DC component of the pixel signal is cut off by the clamping capacitance Cc. Only a variation (AC component) of the pixel signal is input to the inverting amplifier A through the clamping capacitance Cc.

During period $T_4$, when the first and second switches SW1 and SW2 are closed in response to the control signal $\phi c$, an input and an output of the inverting amplifier A are short-circuited, thereby providing a clamping potential $V_1$ to the input and the output of the inverting amplifier A.

Except during period $T_4$, the first and second switches SW1 and SW2 are opened so that the input and the output of the inverting amplifier A are open. In this case, a variation vi of the pixel signal input through a clamping capacitance Cc is amplified $-\alpha$ times by the inverting amplifier A, and a variation vo is output from the inverting amplifier A.

Thereafter, in the same manner, the clamping potential $V_1$ is provided to the input and the output of the inverting amplifier A during period $T_4$ for each pixel signal. Except during period $T_4$, the variation vi of the pixel signal is provided to the inverting amplifier A through the clamping capacitance Cc, and amplified by the inverting amplifier A to output the variation vo.

During a period in which a high-speed response is demanded, i.e., during signal level period $T_2$, the first and second switches SW1 and SW2 are in OFF-state. Thus, an extracting operation of the signal level is not affected by the second capacitance $C_L$ no matter how large it is.

During period $T_4$ in which the clamping operation is performed, the first and second switches SW1 and SW2 are closed. Also, the input and output of the inverting amplifier A are grounded through the large second capacitance $C_L$, which is connected to an intermediate position between the first and second switches SW1 and SW2. Where an output impedance of the inverting amplifier A is Z during period $T_4$, a time constant $\tau_L$ is represented by $Z \times C_L$ ($\tau_L = Z \times C_L$) and can be set to be a sufficiently large value. In this case, it can be considered that the input side of the inverting amplifier A is an integrating circuit. That is, the input side of the inverting amplifier A is provided with a low-pass filter having a cut-off frequency $f_o$ represented by the following expression (8). A frequency characteristic of the low-pass filter is shown as a characteristic curve R(f) in a graph of FIG. 3.

$$f_o = 1/(2\pi\tau_L) \tag{8}$$

Figure 3:
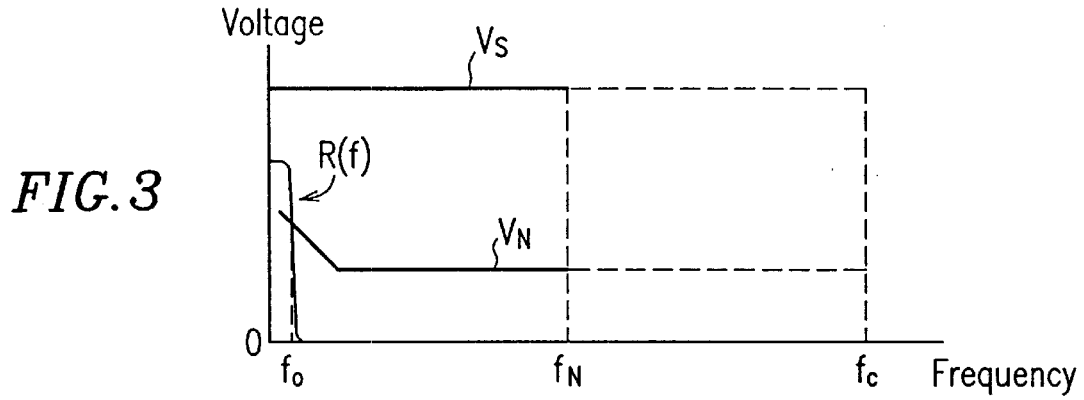
FIG. 3 is a graph showing a characteristic of a low-pass filter, a noise spectrum characteristic of a clamping potential, and a spectrum characteristic of a pixel signal in the clamping circuit shown in FIG. 1.
Figure 8:
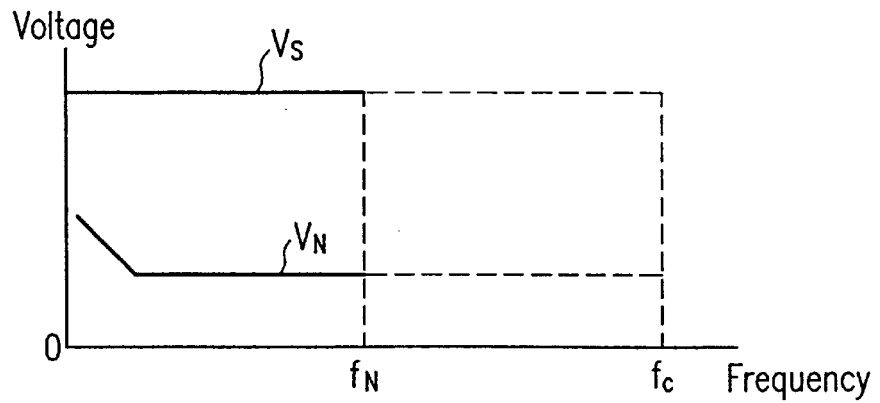
FIG. 8 is a graph showing a noise spectrum characteristic of a clamping potential and a spectrum characteristic of a pixel signal in the clamping circuit shown in FIG. 6A.

In FIG. 3, a characteristic curve $V_N$ represents a noise spectrum of the clamping potential limited by the Nyquist threshold, $f_N = fc/2$ as in FIG. 8, while a characteristic curve Vs represents a noise spectrum of the pixel signal limited by the Nyquist threshold, $f_N = fc/2$ as in FIG. 8.

By adjusting the second capacitance to have a large value and increasing the time constant $\tau_L$ in order to sufficiently reduce the cut-off frequency $f_o$ of the low-pass filter, a large portion of the noise generated due to the clamping operation by the low-pass filter can be eliminated. As a result, a noise component $\Delta vc$ of the clamping potential is suppressed as shown in FIG. 2, and a noise component $\Delta vo$ of an output signal can be also suppressed.

Figure 6A:
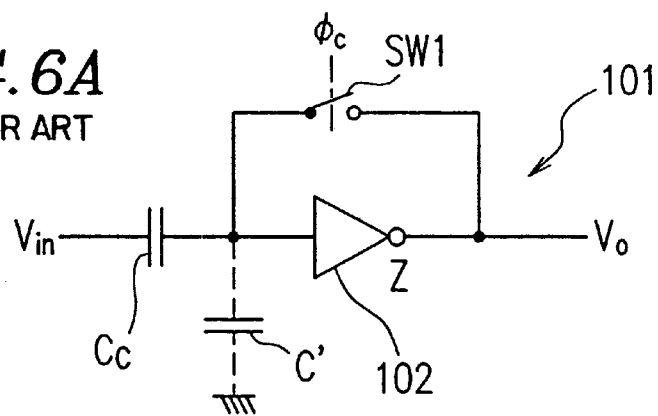
FIG. 6A is a block diagram showing a conventional clamping circuit of a solid-state imaging apparatus.
Figure 6B:
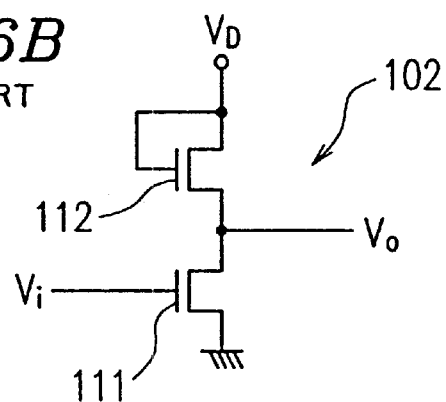
FIG. 6B is a circuit diagram showing an inverting amplifier in the clamping circuit shown in FIG. 6A.
Figure 6C:
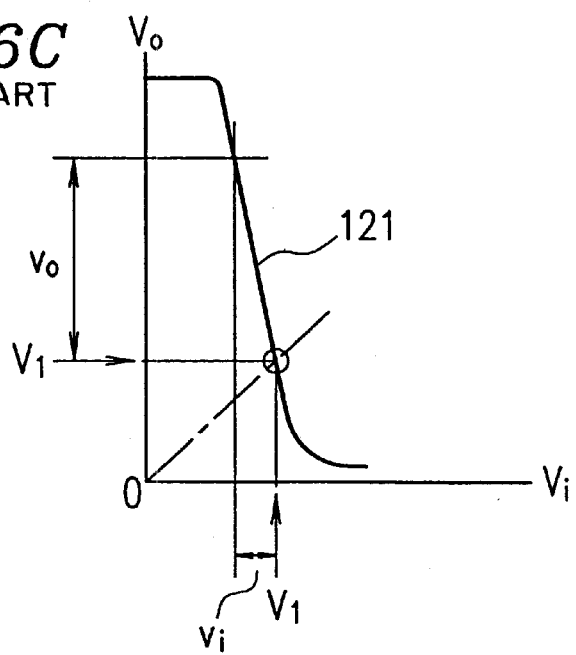
FIG. 6C is a graph showing a characteristic of the inverting amplifier shown in FIG. 6B.
Figure 7:
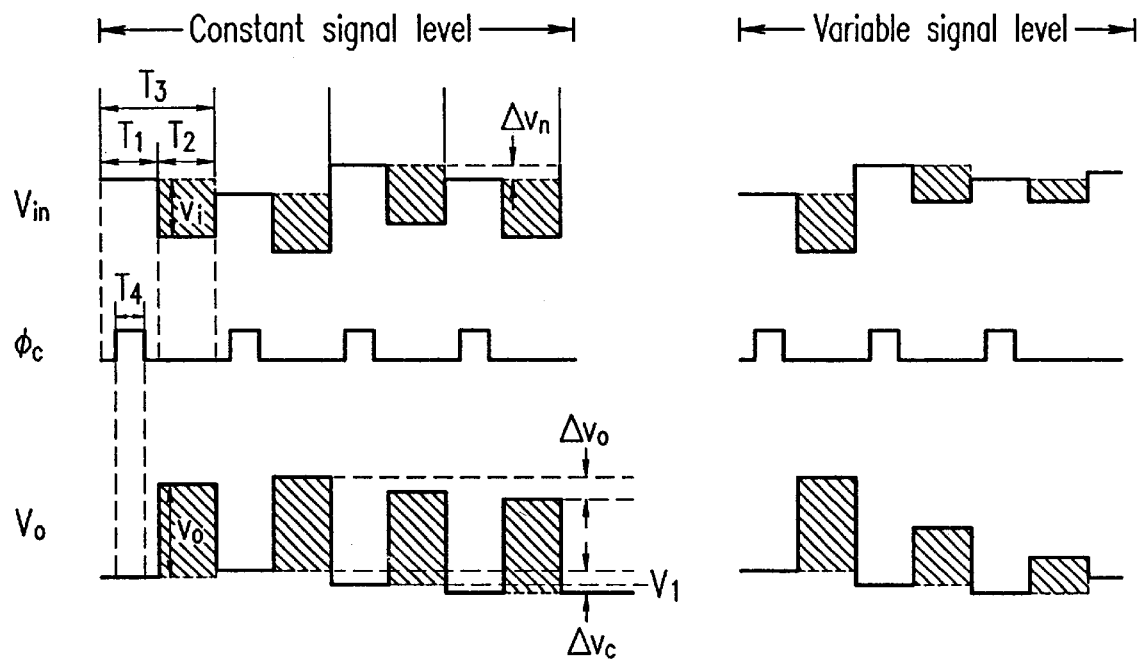
FIG. 7 is a timing chart showing each of the signals in the clamping circuit shown in FIG. 6A.

In the present example, the following effects are further obtained. In the prior art shown in FIG. 6, it is necessary to adjust the output impedance Z of the inverting amplifier so as to be sufficiently small such that the expression, $\tau = C \times Z < T_4$, is satisfied. However, in the present example, when $Cc << C_L$, a clamping potential of the second capacitance $C_L$ is maintained. Therefore, when $\tau_L = Z \times C_L$ is equal to or less than an apparatus rise time (several hundred milliseconds in general), i.e., when the second capacitance $C_L$ is charged with the clamping potential before the apparatus starts its actual operation, the output impedance Z may be large. This significantly relaxes the limitation in designing of the inverting amplifier A.

The clamping operation in the present example is directed to a high-speed operation of a pixel signal in each period. Therefore, when it is combined with a low-speed clamping operation in which a period which is about several hundred times as long as the period of the pixel signal (e.g., a horizontal period in a two-dimensional imaging apparatus) is one unit, a noise in a low frequency band generated due to the low-speed clamping operation can be eliminated.

Figure 4:
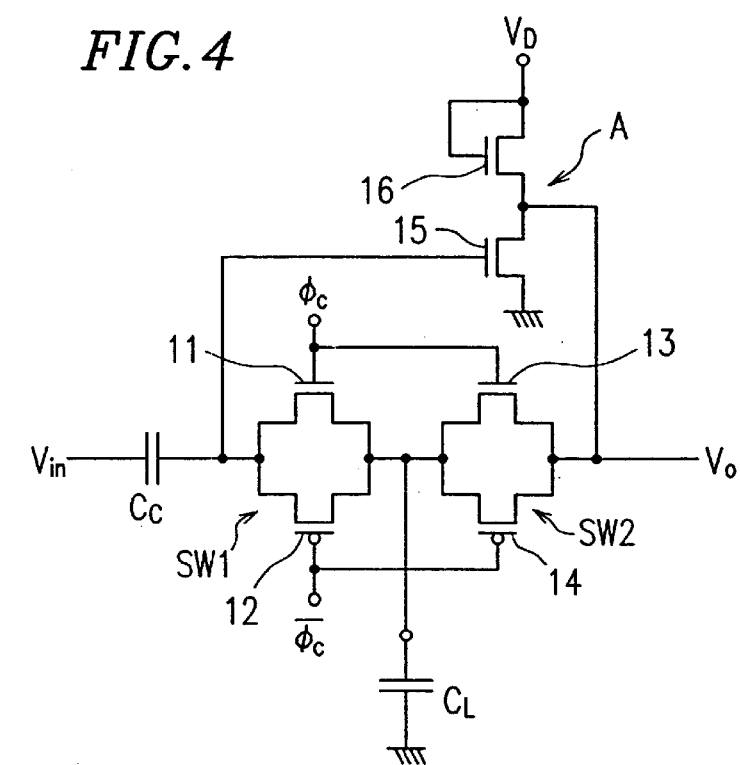
FIG. 4 is a circuit diagram showing an example of a structure of first and second switches in the clamping circuit shown in FIG. 1.

FIG. 4 shows a specific example of the clamping circuit shown in FIG. 1. In this example, the inverting amplifier A includes a combination of n-type MOSFETs 15 and 16. Operation characteristics of this inverting amplifier A are completely identical with those of the inverting amplifier 102 shown in FIG. 6B.

The first and second switches SW1 and SW2 include CMOS circuits. The first switch SW1 includes a combination of an n-type MOSFET 11 and a p-type MOSFET 12. The second switch SW2 includes a combination of an n-type MOSFET 13 and a p-type MOSFET 14. The n-type MOSFETs 11 and 13 operate in response to the control signal $\phi c$. The p-type MOSFETs 12 and 14 operate in response to a control signal $/\phi c$, which is inverse to the control signal $\phi c$.

Thus, by making the first and second switches SW1 and SW2 from CMOS circuits, potentials at both ends of the first and second switches SW1 and SW2 are completely turned ON/OFF at a voltage in the range between 0 and $V_D$. Furthermore, since the first and second switches SW1 and SW2 are driven by the control signals $\phi c$ and $/\phi c$ (clock signals), which are opposite in phase to each other, an induction by each clock signal is canceled, thereby suppressing induction noise generated due to the switching operation. Moreover, a combination of the n-type MOSFET and the p-type MOSFET can easily reduce ON-resistances of the first and second switches SW1 and SW2.

Figure 5:
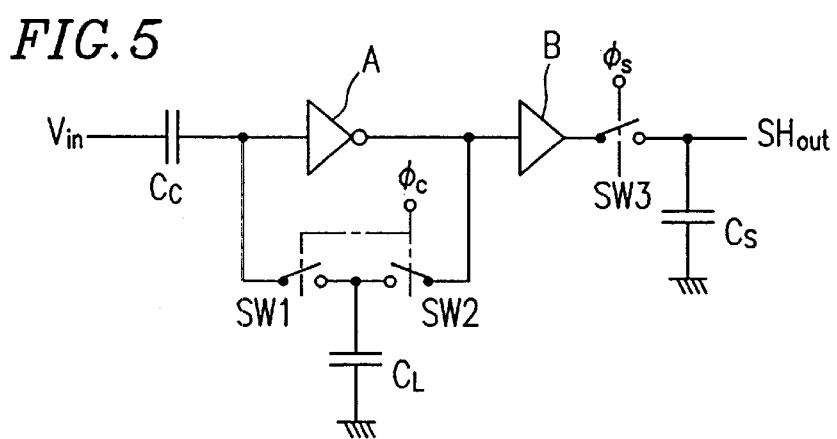
FIG. 5 is a block diagram showing the clamping circuit shown in FIG. 1 and a sample-hold circuit and the like attached thereto.

FIG. 5 shows a circuit configuration for the correlation double sampling, in which a sample-hold circuit is connected at a subsequent stage to the clamping circuit of FIG. 1 through a buffer amplifier B. The sample-hold circuit includes a switch SW3 driven by the control signal $\phi s$ and a hold capacitance Cs. The switch SW3 is made from a MOS transistor or the like according to a known technology.

A signal passed through the clamping circuit of the present example passes through a buffer amplifier B to be a signal Vo shown in FIG. 2. (For simplification, a gain of the amplifier B is set to be 1.) During period $T_5$ within signal level period $T_2$, the switch SW3 is turned ON by the control signal $\phi s$, and a variation vo of the signal Vo is sampled and held in a hold capacitance Cs. As a result, as shown in FIG. 2, an output signal SHout of the sample-hold circuit is obtained by superposing a net variation vo from which noise has been removed on the clamping potential $V_1$, which does not substantially include any noise. This means that a correlation double sampling with a significantly low noise can be achieved. Alternatively, the output signal SHout may be passed through another buffer amplifier.

The present invention is not limited to the above-described example, but can be altered in various manners. For example, inverting amplifiers and switching elements forming switches are not limited to MOSFETs, and other types of active elements may be employed therefor. Resistors and other active elements can be appropriately added to the clamping circuit, when necessary.

As described above, according to the present invention, several types of noises generated during a clamping operation of a pixel signal when the inverting amplifier is employed can be significantly reduced.

When the inverting amplifier is employed, a clamping potential is automatically set at an optimum value and also a high gain is obtained.

Thus, the present invention allows advantageous features of the inverting amplifier to be effectively utilized while suppressing disadvantages thereof on the assumption that the inverting amplifier is employed for a clamping operation of a pixel signal.

The clamping circuit of the present invention can be formed by adding a pair of switch elements and one large second capacitance to a conventional clamping circuit.

Except the clamping operation period, since the second capacitance is separated from the inverting amplifier, it is possible to provide a large capacitance as the second capacitance. Furthermore, since this large second capacitance can be charged with and maintained at the clamping potential, the limitation on the inverting amplifier can be relaxed. The large second capacitance can also be provided external to the clamping circuit, whereby the limitation on the inverting amplifier can be easily relaxed.

When the clamping circuit of the present invention is used for the correlation double sampling, a solid-state imaging apparatus with a remarkably reduced noise can be constructed.

In the case where the first and second switches are formed of an n-type MOSFET and a p-type MOSFET, respectively, and driven by control signals which are opposite in phase to each other, noises generated due to the switching operation are canceled, thereby realizing the clamping operation with further reduced noise.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A clamping circuit of a solid-state imaging apparatus for receiving a pixel signal including a black level and a signal level through a signal line and outputting the pixel signal with noise being suppressed, the clamping circuit comprising:

a first capacitance and an inverting amplifier inserted into the signal line and connected to each other in series;

a first switch and a second switch connected to each other in series to form a serial circuit; and a second capacitance connected between the first and second switches of the serial circuit and a constant potential, wherein:

both sides of the serial circuit including the first switch and the second switch are connected to an input side and an output side of the inverting amplifier, respectively;

the first switch and the second switch are opened and closed in synchronization with a clock signal; and a time constant defined by an output-side impedance of the inverting amplifier and the second capacitance when the first switch and the second switch are closed is sufficiently greater than a cycle of the clock signal.

2. A clamping circuit of a solid-state imaging apparatus according to claim 1, wherein:

the first switch includes a first MOSFET of a first conductive type and a second MOSFET of a second conductive type which are connected in parallel with each other;

the second switch includes a third MOSFET of the first conductive type and a fourth MOSFET of the second conductive type which are connected in parallel with each other;

the first MOSFET and the third MOSFET are driven by a first control signal;

the second MOSFET and the fourth MOSFET are driven by a second control signal; and a polarity of the first control signal and a polarity of the second control signal are different from each other.

3. A clamping circuit of a solid-state imaging apparatus according to claim 1, further comprising a sample-hold circuit for sampling and holding a signal level of the pixel signal input from the inverting amplifier, wherein:

in a black level period of the pixel signal, the first switch and the second switch are closed to perform a clamping operation, and in a signal level period of the pixel signal, the sample-hold circuit samples and holds a signal level of the pixel signal.

4. A clamping circuit of a solid-state imaging apparatus according to claim 1, wherein the second capacitor is an external capacitor.

* * * * *